United States Patent
Killian et al.

(10) Patent No.: US 6,282,633 B1
(45) Date of Patent: Aug. 28, 2001

(54) HIGH DATA DENSITY RISC PROCESSOR

(75) Inventors: Earl A. Killian, Los Altos Hills; Ricardo E. Gonzalez, Menlo Park; Ashish B. Dixit, Mountain View; Monica Lam, Menlo Park, all of CA (US); Walter D. Lichtenstein, Belmont, MA (US); Christopher Rowen, Santa Cruz, CA (US); John C. Ruttenberg, Newton, MA (US); Robert P. Wilson, Palo Alto, CA (US)

(73) Assignee: Tensilica, Inc., Santa Clara, CA (US)

( * ) Notice: Subject to any disclaimer, the term of this patent is extended or adjusted under 35 U.S.C. 154(b) by 0 days.

(21) Appl. No.: 09/192,395

(22) Filed: Nov. 13, 1998

(51) Int. Cl.$^7$ .................................................. G06K 9/30
(52) U.S. Cl. ......................... 712/208; 712/210; 712/226
(58) Field of Search ............................... 712/24, 41, 200, 712/208, 210, 223, 225, 226

(56) References Cited

U.S. PATENT DOCUMENTS

| | | | |
|---|---|---|---|
| 5,155,820 | 10/1992 | Gibson | 712/210 |
| 5,426,743 | 6/1995 | Phillips et al. | 712/221 |
| 5,581,717 | 12/1996 | Boggs et al. | 712/208 |
| 5,638,524 | * 6/1997 | Kiuchi et al. | 712/221 |
| 5,991,870 | * 11/1999 | Koumura et al. | 712/208 |

FOREIGN PATENT DOCUMENTS

| | | |
|---|---|---|
| 0 363 222 A2 | 4/1990 | (EP) . |
| 0 374 419 A2 | 6/1990 | (EP) . |
| 0 660 223 A2 | 6/1995 | (EP) . |
| 0 696 772 A2 | 2/1996 | (EP) . |
| 0 924 601 A2 | 6/1999 | (EP) . |
| WO 93/01543 | 1/1993 | (WO) . |

OTHER PUBLICATIONS

Texas Instruments, "TMS32010 User's Guide", 1983, p. 3–7.*
Lefugy, C. et al., "improving Code Density using Compression Techniques", 12/97. p. 194–204.*
Conte, T.M. et al., "Instruction Fetch Mechanisms for VLIW Architectures Compressed Encodings", 12/96. p. 201–211.*

* cited by examiner

Primary Examiner—John F. Niebling
Assistant Examiner—Stacy Whitmore
(74) Attorney, Agent, or Firm—Pillsbury Winthrop LLP

(57) ABSTRACT

A RISC processor implements an instruction set which, in addition to optimizing a relationship between the number of instructions required for execution of a program, clock period and average number of clocks per instruction, also is designed to optimize the equation S=IS * BI, where S is the size of program instructions in bits, IS is the static number of instructions required to represent the program (not the number required by an execution) and BI is the average number of bits per instruction. Compared to conventional RISC architectures, this processor lowers both BI and IS with minimal increases in clock period and average number of clocks per instruction. The processor provides good code density in a fixed-length high-performance encoding based on RISC principles, including a general register with load/store architecture. Further, the processor implements a simple variable-length encoding that maintains high performance.

21 Claims, 6 Drawing Sheets

| | |
|---|---|
| add.n | Add contents of two registers |
| addi.n | Add register and immediate encoded constant |
| addmi | Add shifted constant to base register |
| bbci | Branch if register bit is zero |
| bbsi | Branch if register bit is one |
| beqi | Branch if equals encoded constant |
| beqz.n | Forward branch with unsigned offset if register is zero |
| bf | Branch if coprocessor Boolean register is zero |
| bgei | Branch if greater than or equal to encoded constant |
| bgeui | Branch if greater than or equal to encoded unsigned constant |
| blt | Branch if less than |
| blti | Branch if less than encoded constant |
| bltui | Branch if less than equal to encoded unsigned constant |
| bnei | Branch if not equal encoded constant |
| bnez.n | Forward branch with unsigned offset if register is non-zero |
| break.n | Break |
| bt | Branch if coprocessor Boolean register is one |
| extui | Shift followed by AND with encoded mask |
| isync, rsync, esync, dsync | Stage synchronization |
| l16si | Signed 16-bit load |
| l16ui | Unsigned 16-bit load |
| l32i.n | Load 32 bits with offset |
| l32r | Access constant pool using PC-relative load |
| l8ui | Unsigned 8-bit load |
| loop, done | Loop demarcation |
| loopgtz | Loop if greater than zero |
| loopnez | Loop if not equal zero |
| mov.n | Move contents of one register to another |
| movi | Load sign-extended pair of fields to register |
| movi.n | Load register with immediate |
| nop.n | No operation |
| ret.n, retw.n | Return |
| s32i.n | Store 32 bits with offset |
| --- | Compound compare and branch instructions |
| --- | Funnel shift |
| --- | Left shift & add/subtract |
| --- | Load/store at constant offset |

| add.n | Add contents of two registers |
|---|---|
| addi.n | Add register and immediate encoded constant |
| addmi | Add shifted constant to base register |
| bbci | Branch if register bit is zero |
| bbsi | Branch if register bit is one |
| beqi | Branch if equals encoded constant |
| beqz.n | Forward branch with unsigned offset if register is zero |
| bf | Branch if coprocessor Boolean register is zero |
| bgei | Branch if greater than or equal to encoded constant |
| bgeui | Branch if greater than or equal to encoded unsigned constant |
| blt | Branch if less than |
| blti | Branch if less than encoded constant |
| bltui | Branch if less than equal to encoded unsigned constant |
| bnei | Branch if not equal encoded constant |
| bnez.n | Forward branch with unsigned offset if register is non-zero |
| break.n | Break |
| bt | Branch if coprocessor Boolean register is one |
| extui | Shift followed by AND with encoded mask |
| isync, rsync, esync, dsync | Stage synchronization |
| l16si | Signed 16-bit load |
| l16ui | Unsigned 16-bit load |
| l32i.n | Load 32 bits with offset |
| l32r | Access constant pool using PC-relative load |
| l8ui | Unsigned 8-bit load |
| loop, done | Loop demarcation |
| loopgtz | Loop if greater than zero |
| loopnez | Loop if not equal zero |
| mov.n | Move contents of one register to another |
| movi | Load sign-extended pair of fields to register |
| movi.n | Load register with immediate |
| nop.n | No operation |
| ret.n, retw.n | Return |
| s32i.n | Store 32 bits with offset |
| --- | Compound compare and branch instructions |
| --- | Funnel shift |
| --- | Left shift & add/subtract |
| --- | Load/store at constant offset |

FIGURE 3

HIGH DATA DENSITY RISC PROCESSOR

BACKGROUND OF THE INVENTION

1. Field of the Invention

The present invention is directed to microprocessor systems; more particularly, the invention is directed to high-performance reduced instruction set computer (RISC) architecture processors which implement highly efficient usage of instruction width.

2. Description of Related Art

The design of processor instruction sets is a well-established art. Most instruction set features are not new in themselves. However, individual features can be combined in new and unique ways that advance the state of the art. In particular, when instruction set design is optimized for a different use than prior instruction sets, significant improvements may result when a processor implementing that instruction set is used in the target application.

Instruction set design needs to balance many competing goals, including the size of the machine code required to encode various algorithms; the extensibility and adaptability of the instruction set for new algorithms and applications; the performance and power consumption of processors that implement the instruction set on such algorithms; the cost of processors that implement the instruction set; the suitability of the instruction set for multiple processor implementations over time; the complexity of design of processors that implement the instruction set; and the suitability of instruction set as a target for compilation from high-level programming languages.

The instruction set has one direct and two indirect influences on processor performance. The instruction set directly determines IE, the number of instructions required to implement a given algorithm, although the suitability of the instruction set as a target for compilation is a factor here as well. The other components of processor performance are clock period CP and the average clocks per instruction CPI. These are primarily attributes of the implementation of the instruction set, but instruction set features may affect the ability of the implementor to simultaneously meet time per clock and clocks per instruction goals. For example, an encoding choice might mandate additional logic in series with the rest of instruction execution, which an implementor would either address by increasing the time per clock, or by adding an additional pipeline stage, which will usually increase the clocks per instruction.

In the 1980s and 1990s, a new instruction set architecture called RISC developed. It was born of the realization of the above tradeoff, namely that $$T = IE * CPI * CP$$

where T is the program execution time in seconds and the other variables are as described above. RISC instruction sets allowed implementors to improve CPI and CP significantly without increasing IE by much. RISC instruction sets improved the performance of processors, lowered design complexity, allowed lower cost processor implementations at a given performance level, and was well suited to compilation from high-level programming languages.

The processor architecture community has never agreed on a completely satisfactory definition of RISC, but it has generally included most of the following attributes: fixed size instruction words; arithmetic and other computation operations are performed on operands read from a general register file with 16 or more registers and results are written to the same register file; fixed positions in the instruction word for source register fields so that register file access can occur in parallel with instruction decode; memory access is primarily done via loads from memory to registers, and stores to memory from registers (as opposed to having memory operands in computational instructions); a small number (often 1, usually less than 4) of methods for computing memory addresses; avoidance of features that would make pipelined execution of instructions difficult (e.g., use of a hardware resource more than once by a given instruction); and avoidance of features that require microcode or its equivalent. Not all processors considered to be RISCs contain all of the above elements, but all contain most of the above.

The early RISC instruction sets were not however particularly efficient at producing compact machine code. In particular, RISC instruction sets usually required more bits to encode an application than pre-RISC instruction sets. The size of the machine code for an application is often more important than the cost of the processor itself in the total solution cost, because larger memories are required to hold the application. RISC is still acceptable in many applications where performance is most important, but instruction sets that have the advantages of RISC but reduced code size would be useful in many other processor applications.

Some of the early processor instruction sets (IBM 7090, CDC 6600, DEC PDP6, GE 635) had some of the characteristics of RISC because they were designed to be directly executed by hardware, without microcode, like RISC. Most of these instruction sets are not very suitable for modem high-level languages and applications because of features such as word (as opposed to byte) addressing, limited address space, and peculiar combinations of operations. Most were in fact intended for assembly language programming. Several were also based on 36-bit data word and instruction width, and 36-bit instructions are not very good for code density. Several were based on an accumulator and memory paradigm for computation, which limits performance. None had the desired characteristics, although some of the individual features of this invention can be traced to these generations of machines.

The use of microcode to implement processors made more complicated instruction sets feasible (IBM 360, DEC PDP11, DEC VAX, Intel x86, LLNL S-1, Motorola 68000). The next generation of processors therefore had complex instruction sets with good code density, partially due to complex variable instruction length encodings. However, microcoded processors and their complex instruction sets were often not well-suited to high performance. Complex instructions were implemented by iteration of a micro-engine, instead of direct execution in a hardware pipeline, which increased CPI.

Various different styles of instruction set design emerged in this era with a tendency away from one or two accumulators to either general register architectures or stack architectures. The implementation cost of registers or stacks had become low enough that instruction sets could use these advantageous styles.

As mentioned above, although a significant improvement in performance, RISC was a set-back for code density. Most RISC instruction sets are based on fixed length 32-bit instructions, and 32 bits turns out to be more than is necessary. Also, some sort of variable length encoding is necessary to achieve the best code density. Stack architectures faded away at this point because of their low performance, despite their code size advantage, which shows how important it is that an instruction set achieve both performance and code size goals.

To compensate for the code size disadvantage of RISC, several processor designers introduced compact encodings of their instruction sets. ARM's Thumb and MIPS' MIPS16 are examples. Both use predominately 16-bit instructions with a small number of 32-bit instructions. The 16-bit encodings (which provide smaller code by halving the number of bits per instruction), yield poor performance because of having only 8 registers (increases IE), the use of implied source register operands (increases CP or CPI), limited range of constants in the instruction word (increases IE), and restrictions on the number of distinct register operands (two or less for most instructions—increases IE).

The Hitachi SH instruction set is RISC-like, and targeted code size as an objective. It started with a 16-bit instruction set, but found it later necessary to add 32-bit instructions. It has 16 registers, but still has at most two register fields per instruction (increases IE), and has severely limited branch offsets.

What is needed is an instruction set design that gives the performance and other advantages of RISC, and yet provides small cost-effective machine code. To facilitate high-performance implementations without excessive complexity, the instruction set should be directly executable without microcode by a simple, short pipeline. There should be a sufficient number of general registers to achieve good performance and to be a suitable target for optimizing compilers. Other techniques may be used to further reduce code size.

BRIEF SUMMARY OF THE INVENTION

In view of the above problems of the prior art, it is an object of the present invention to provide a processor implementing a 24-bit encoding of a full-featured RISC instruction set.

It is a further object of the present invention to provide a processor implementing an instruction set having instructions which work together synergistically to keep the static number of instructions required to represent a program low when using instruction encodings with limited average number of bits per instruction. Providing an efficient encoding of instruction constants in a narrow instruction word is part of this invention's contribution to the art.

It is another object of the present invention to provide a processor implementing a RISC instruction set using a 24-bit instruction word encoding compare and branch instructions using just the most useful comparisons and forms with longer target specifiers for common cases.

It is a still further object of the present invention to provide a processor implementing a general-purpose (as opposed to specialized, such as DSP) instruction set having a reduced overhead looping capability which reduces the static number of instructions and cycles required to represent a program and the number of instructions required to execute the program.

The above objects are achieved according to a first preferred embodiment of the present invention by providing a RISC processor implementing an instruction set which, in addition to being tailored to the equation T=IE*CPI*CP described above, also is designed with the following code size equation in mind:

$$S = IS * BI$$

where S is the size of program instructions in bits;
IS is the static number of instructions required to represent the program (not the number required by an execution, as earlier); and
BI is the average number of bits per instruction.

Compared to RISC, this invention lowers both BI and IS with minimal increases in CP and CPI. It has features that simultaneously increase and decrease IE.

This aspect of the invention is designed with the recognition that it must provide good code density in a fixed-length high-performance encoding based on RISC principles, including a general register with load/store architecture. To achieve exemplary code density the embodiment adds a simple variable-length encoding that doesn't compromise performance. This embodiment also optimizes the cost of processor implementation.

BRIEF DESCRIPTION OF THE DRAWINGS

The above and other objects of the present invention will become readily apparent when reading the following detailed description taken in conjunction with the appended drawings in which:

FIG. 2 is a block diagram of a pipeline used in the processor according to the preferred embodiment and FIG. 3 is a chart of instructions used in the preferred embodiment.

DETAILED DESCRIPTION OF PRESENTLY PREFERRED EMBODIMENTS

Figure 1A:
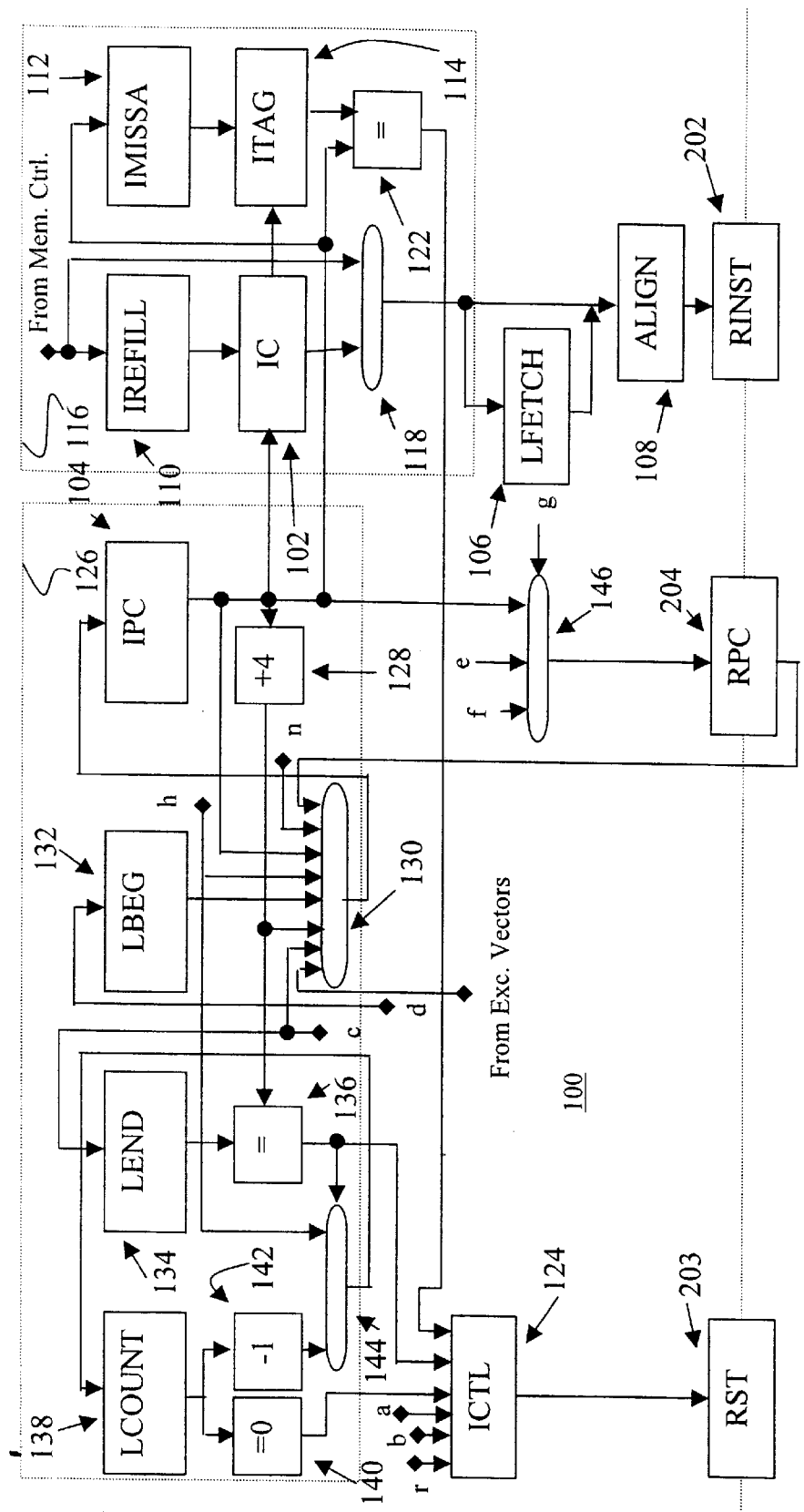
FIG. 1 is a block diagram of a processor implementing an instruction set according to a preferred embodiment of the present invention.
Figure 1B:
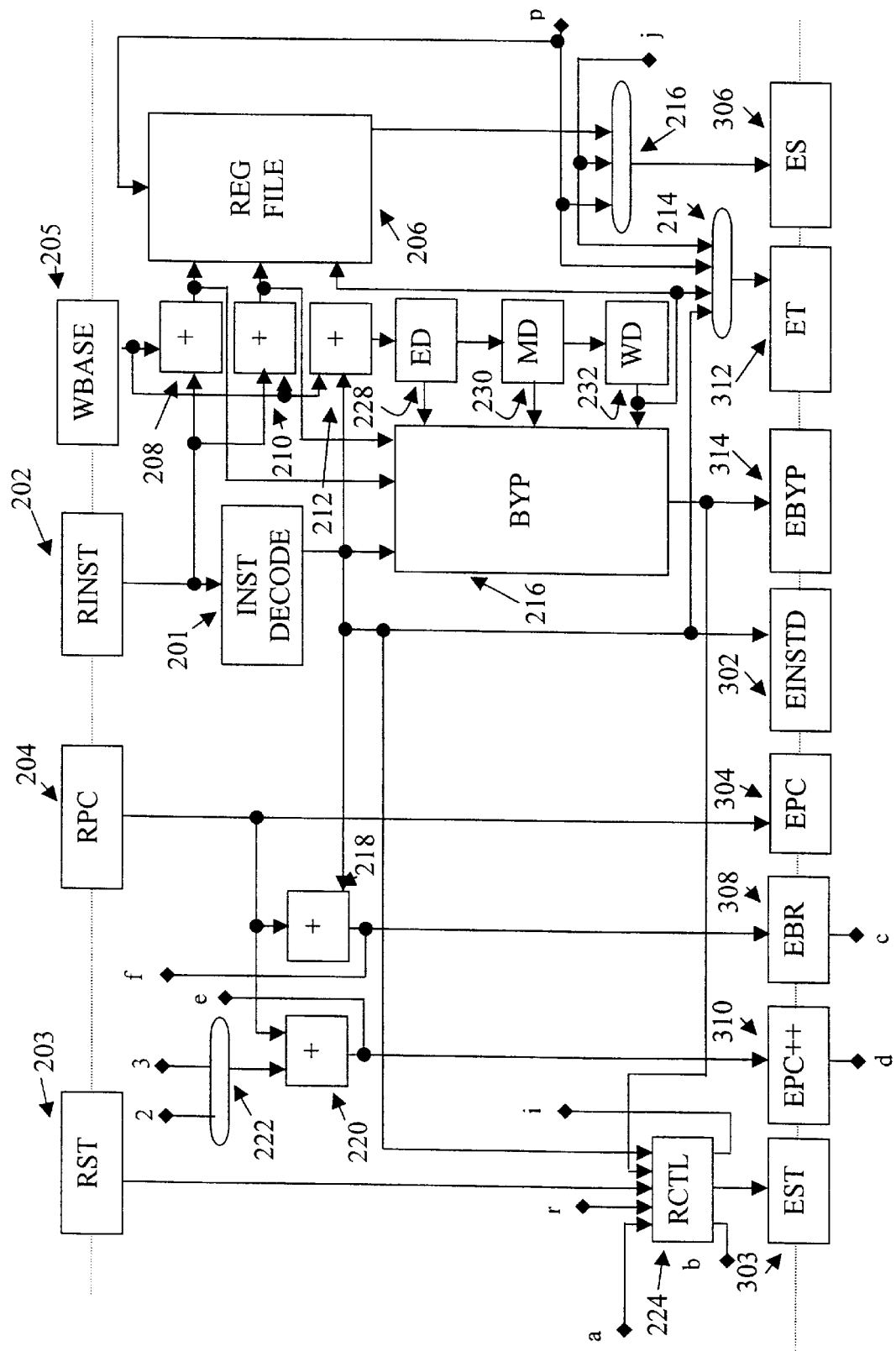
Figure 1C:
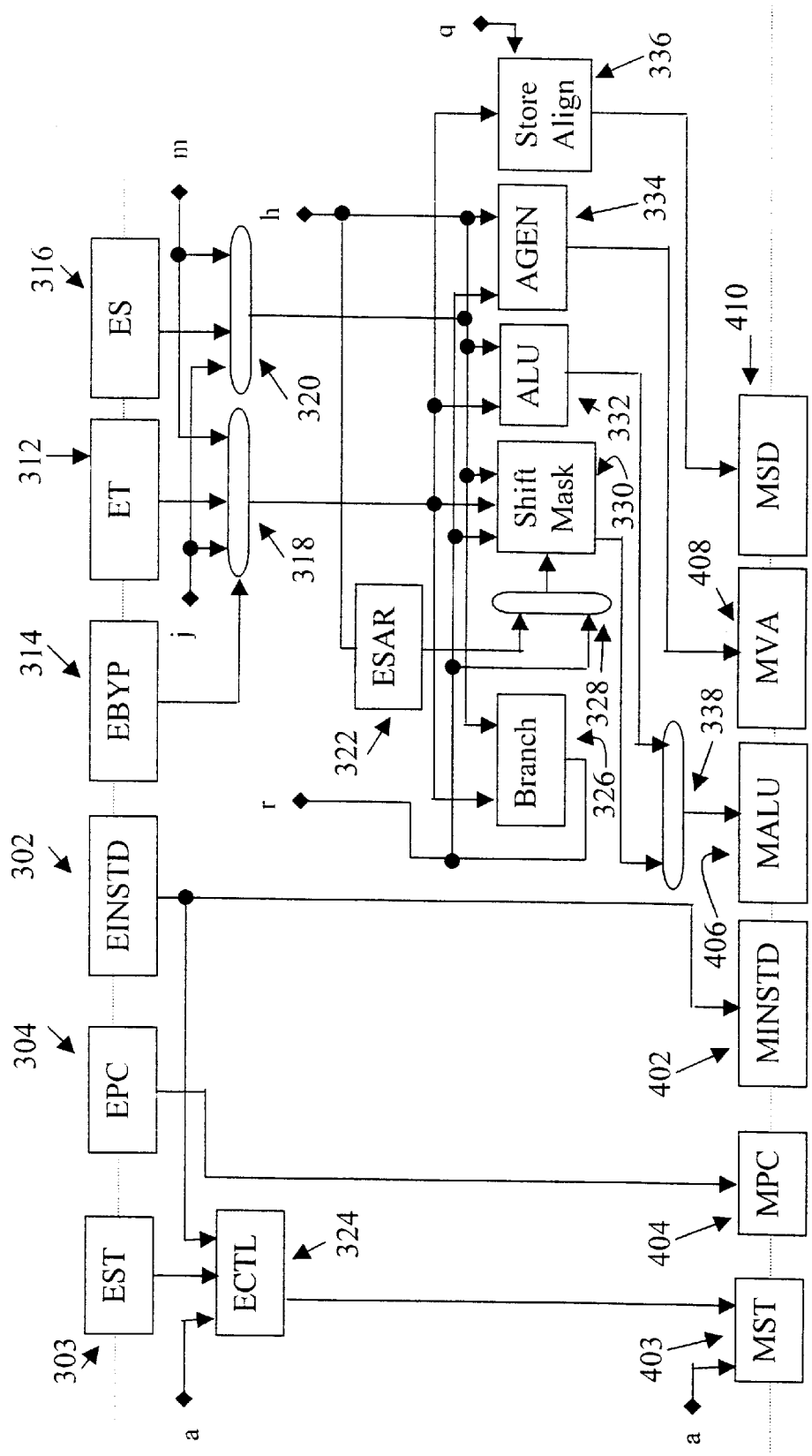
Figure 1D:
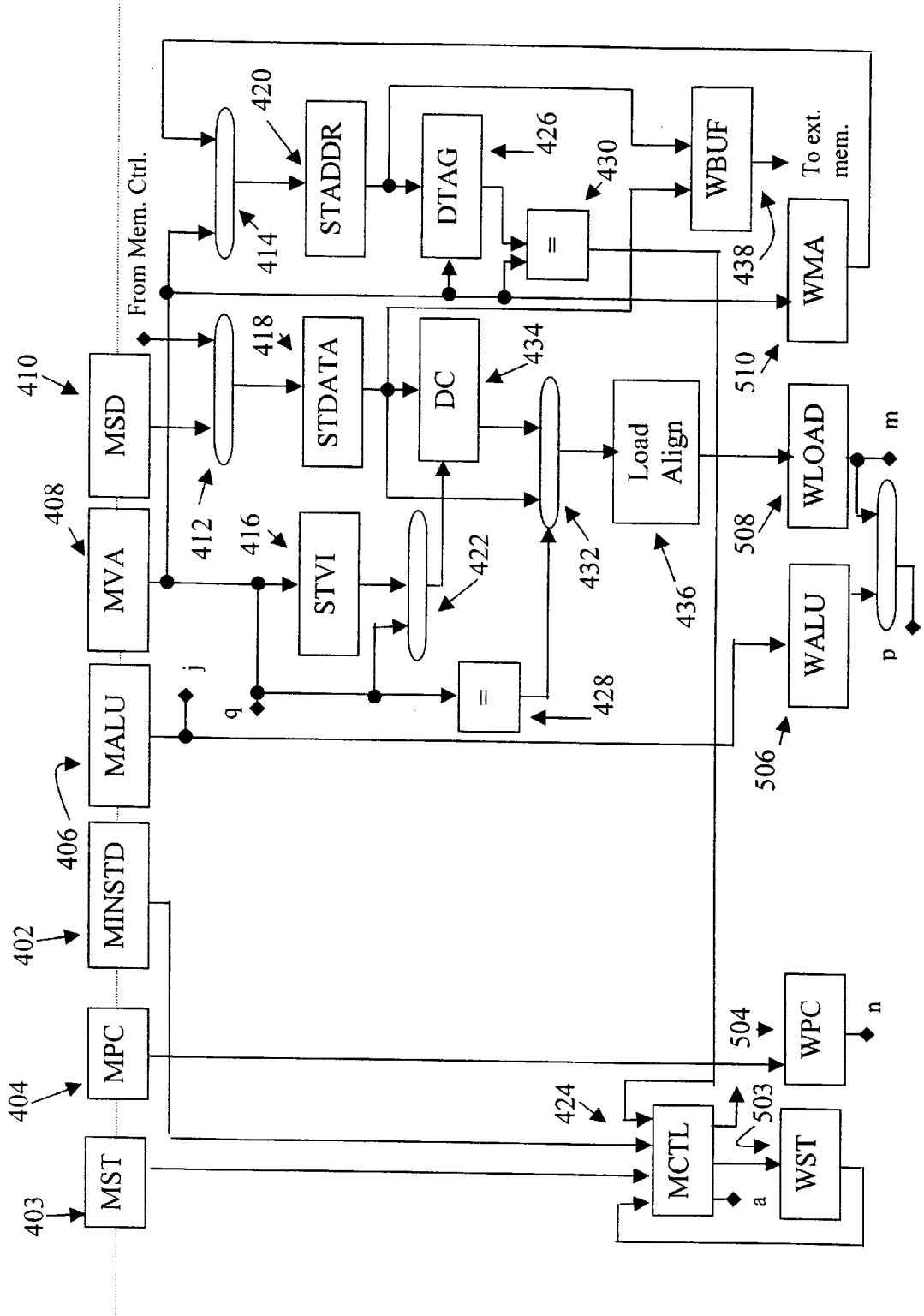

A processor suitable for implementing an instruction set according to a preferred embodiment of the invention is shown in FIG. 1. In general, the processor has a $2^{32}$ byte, i.e., 4 GB, virtual memory for instructions and data; a 32 bit program counter IPC; sixteen or more 32 bit general registers; a shift address register SAR; a 32 bit loop begin address register LBEG, a 32 bit loop end address register LEND, and a 32 bit loop count register LCOUNT, all three of which are used by reduced-overhead loop instructions described in greater detail below.

More specifically, the processor pipeline has five basic stages: the instruction fetch, or I stage 100; the instruction decode and register access, or R stage 200; the execution and address calculation, or E stage 300; the memory access, or M stage 400; and the writeback, or W stage 500. In the I stage 100, program memory is accessed to retrieve instructions to be executed. In the R stage 200, the instruction thus fetched is decoded and the registers it uses, if any, are accessed. Then, in the E stage 300, register contents and constants decoded in the R stage 200 are processed by the processor's ALU 332 according to the instruction operand. In the M stage 400, any necessary memory accesses such as loads, stores, etc. are performed. Finally, in the W stage 500 the results of executing the instruction are written back to the general-purpose registers as dictated by the instruction operand.

More specifically, in the I stage 100 a word is extracted from the instruction cache 102 on the basis of the address held in the I stage program counter IPC 104. That word is then combined with the last word read from the instruction cache RAM IC 102 (forming, together with the other components described below, an instruction cache 116) held in last fetch register LFETCH 106 by the align unit ALIGN 108 and stored in the R stage instruction register RINST 202. Cache misses are handled by memory fetches from main program memory through staging register IREFILL 110 to cache RAM IC 102 and tags are adjusted accordingly using register IMISSA 112 and tag cache RAM ITAG 114. Multiplexer 118 selects either the output of the cache RAM IC 102 or the instruction fetched directly from main memory and outputs the chosen data to align unit 108 which concatenates it with the last fetched word stored in last fetch register 106 and selects a subset thereof, if necessary, to adjust for instruction length variations. Tag comparator 122 detects cache misses and provides indication thereof to I stage controller 124 which controls the overall operation of the stage.

It should be noted that although the circuitry denoted as element 104 is called a program counter herein, the I stage program counter 104 is not actually used to count instructions to be fetched; rather, it counts words. The subsequent program counters such as R stage program counter 204 do, however, count actual instructions in the preferred embodiment. Also, those skilled in the art will readily understand that in addition to I stage controller 124, the corresponding R stage controller 224 E stage controller 324 and M stage controller 424 each controls the overall operation of its respective stage. Also, the R stage status register 203, the E stage status register 303, M stage status register 403 and W stage status register 503 each provides relevant status information about the instruction in its respective pipeline stage to the respective controller, e.g., whether the data is valid, etc. Further, certain features such as multiplexer select lines running from the stage controllers to their respective multiplexers, clock signals, exception vector addresses and the like have been omitted for ease of explanation; however, their placement is readily apparent to those skilled in the art.

While the instructions are being supplied to the R stage instruction register 202, an adder 128 in the next address generation section 126 increments the current word address to point to the next word to be fetched and provides it to multiplexer 130 which feeds it back to the instruction program counter 104. When a loop instruction (described in greater detail below) is executed, it loads a beginning loop address into a loop begin register LBEG 132, and the multiplexer 130 then supplies the begin address to the program counter 104. Also used in loop instructions, the loop end register 134 supplies a value which is compared to the current address by comparator 136 to detect the end of loop condition and decrement the loop index register LCOUNT 138. Comparator 140 provides an indication to the instruction controller 124 when the count is zero to continue execution outside the loop; otherwise, LCOUNT 138 is decremented by decrementer 142 and passed through multiplexer 144 (also used to load the register). Finally, R stage PC selection multiplexer 146 selects the address value to be supplied to the E stage 300 as will be described in greater detail below.

The instruction stored in the R stage instruction register 202 is decoded by decoder 201 to extract predetermined parameter fields and to decode immediate or constant fields according to the instruction opcode. The decoded instruction is pipelined to the E stage instruction decode register 302 for execution. In parallel with the instruction decode operation, fields from the instruction are passed to a register file 206 via adders 208–212 to add a window base value thereto for windowed register operation as will be described in greater detail below. One adder is used for each of the two source register fields and one destination register field that may be present in an instruction.

Values in the register file 206 are read and supplied to multiplexers 214 and 216 and then to E stage S and T registers 304 and 306. The multiplexers 214 and 216 can supply values from the register file 206 or, if the needed data has not yet been written into the file 206, may use values supplied from the E stage as described below. Multiplexer 214 may also receive a constant value from the instruction decoder 204.

Adder 218 computes an indexed target address based on the contents of the R stage program counter 201 and an index constant from the instruction decoder 204 and stores the result in an E stage branch register 308. Adder 220 computes a next instruction address by adding two or three to the value in R stage program counter 201 depending on the instruction length via multiplexer 222 and passes the result to next PC register 310 for use if a branch is not taken.

Moving on to the E stage 300, the bypass multiplexers 318 and 320 select the operands for the various functional units (Branch 326, Shift/Mask 330, ALU 332, AGEN 334, and Store Align 336). The multiplexer select was computed in the R stage 200 by the bypass block EBYP 314 based on instructions currently in the E stage 300, the M stage 400 and the W stage 500 by respective registers 228, 230 and 232, and pipelined through EBYP 226. When a results is taken from the R stage 200, each multiplexer 318, 320 selects the ET register 312 or the ES register 316. Other inputs to multiplexers 318 and 320 are from the M stage 400 and W stage 500.

The branch unit 326 uses the two operands from multiplexers 318 and 320 to produce a conditional branch taken/not-taken decision, which is fed controllers 124 and 224 in the I stage 100 and R stage 200, respectively, as well as mux selects therein. The Shift/Mask unit 330 implements the shift and extract instructions based on the output of multiplexer 328. It takes two operands from multiplexers 318 and 320 as well as the mask input from the decoded instruction register EINSTD 302, which also feeds M stage instruction register MINSTD 402. The shift amount is selected from EINSTD 302 for shifts by constants or ESAR 322 for shifts by a variable amount. ESAR 322 contains the ISA state SAR for the E-stage 300.

The ALU 332 implements the arithmetic and logical functions, including ADD, ADDI, ADDX2, SUB, AND, OR, XOR. The outputs of the Shift/Mask unit 330 and ALU 332 are multiplexed based on the instruction type in multiplexer 338 and fed into the MALU register 406. The address generation unit AGEN 334 computes the sum of a register operand and the offset from the decoded instruction in EINSTD 302. The output is sent to the M stage virtual address register MVA 408. The store align unit 336 shifts the ET multiplexer 318 output by 0, 8, 16, or 24 places to align the store data into the proper byte positions for memory. The output is sent to the M-stage store data register MSD 410.

Similar to previous pipe stages, ECTL 324 handles the control for the E-stage 300 and updating the status of the instruction being executed therein. The E-stage instruction address program counter EPC 304 is pipelined along to the M-stage instruction address program counter MPC 404 for exception processing.

The M stage 400 of the pipeline handles the second half of load and store instructions, and exception determination for all stages. The output of MPC 404 is sent to the WPC register 504. If the instruction in the M-stage 400 is invalidated by an exception or interrupt, the output of WPC 504 will be loaded into one of the ISA-specified exception instruction address registers EPC[i] (not shown) (different from the E-stage program counter EPC 304). If the instruction in the M-stage 400 must be retried (e.g., due to a cache miss), then the contents of the WPC register 504 are sent back to the I stage 100 to restart the instruction fetch.

A shift or ALU instruction simply forwards data from MALU 406 to WALU 506 in this stage. The output of MALU 406 is also provided to the bypass multiplexers 318 and 320 in this stage to allow the output of a shift or ALU instruction to be used by a subsequent instruction before it is written to the register file. Load instructions in the W-stage 500 read both the data cache RAM and the data tag RAM. Store instructions in the W-stage 500 read only the data tag RAM; the data cache RAM write is delayed until the tag compare is complete. Non-load instructions write any pending store data to the data cache RAM. A store followed by a load to the same address requires a special bypass, because the store data will not have been written to the data cache RAM.

A load instruction in its W-stage 500 sends the index portion of virtual address MVA 408 to the address input of the data tag RAM, and also through multiplexer 422 to the address input of the direct-mapped data cache RAM DC 434. In parallel with the read of DC 434, the address is compared to the pending store virtual index and valid bit in STVI 416. If, based on the output of comparator 428, the read is for the cache index of the pending store, multiplexer 432 selects the result of the pending store data buffer 418; otherwise the DA read data is selected. Multiplexer 432 feeds the load align circuit 436 which shifts the load data by 0, 8, 16, or 24 based on the low two bits of the virtual address, and then for the L8UI and L16UI instructions zero-extend from bit 7 or 15 respectively, and for the L16SI instruction sign-extends from bit position 15. This result is latched by WLOAD 508. The output of the data tag RAM is compared to the high-order bits of the M-stage virtual address from MVA 408 by comparator 430, and this hit/miss result is sent to the M-stage control logic MCTL 424 which handles cache misses and exceptions. Finally, the load virtual address is captured in WMA 510 to handle cache misses.

Load cache misses invalidate the instructions in the I to M stages of the pipeline. The load address from WMA 510 is sent to the external memory. Data read from that memory is written into the data cache RAM 424 through multiplexer 412 and STDATA 418 using the low-order bits of WMA 510 as an address. The data tag RAM 426 is written through multiplexer 414 and STADDR 420 from the high-order miss address captured in WMA 510, with DTAG 420 being addressed by the less significant bits from MVA 408.

A store instruction in its W stage 500 puts the store address and data into STADDR 418 and STDATA 420. In addition the data tag RAM 426 is accessed, and the result compared to the high-order bits of MVA 408 to determine if the store address is a hit or miss. If the store hits in the cache, then on the first non-load cycle, the contents of STDATA 418 will be written into the data cache RAM 424 at the address stored in STDATA 418. When the cache miss refill is complete, the instruction fetch unit begins the fetching instructions again starting with the load instruction that missed.

The data cache of this embodiment is write-thru, and so the store address and data are also sent from STADDR 420 and STDATA 418 to a write buffer 438 where they are held until written to external memory.

The output of the WALU and WLOAD registers 506 and 508 is selected by multiplexer 512 to be written into the register file 206 in the R stage 200, if the instruction is still valid at this point, and it is an instruction that has a A-register result.

The processor also has a 6 bit shift amount register which is used to provide conventional immediate shifts such as logical left, logical right and arithmetic right but does not provide single instruction shifts where the shift amount is a register operand because direct variable shifts can be a critical timing path, and simple shifts do not extend efficiently to larger widths. Although funnel shifts can be extended, they require too many operands. A processor according to the preferred embodiment of the present invention solves these problems by providing a funnel shift where the shift amount is taken from the SAR register. Variable shifts are synthesized by the compiler using an instruction to compute SAR from the shift amount in a general register, followed by a funnel shift. The legal range of values for SAR is 0 to 32, not 0 to 31, so six bits are used for the register.

Of course, given the description of the instruction set described in detail below, various other processor architectures following the invention will become readily apparent to those skilled in the art. These structure, too, are intended to be within the scope of the appended claims.

Figure 2:
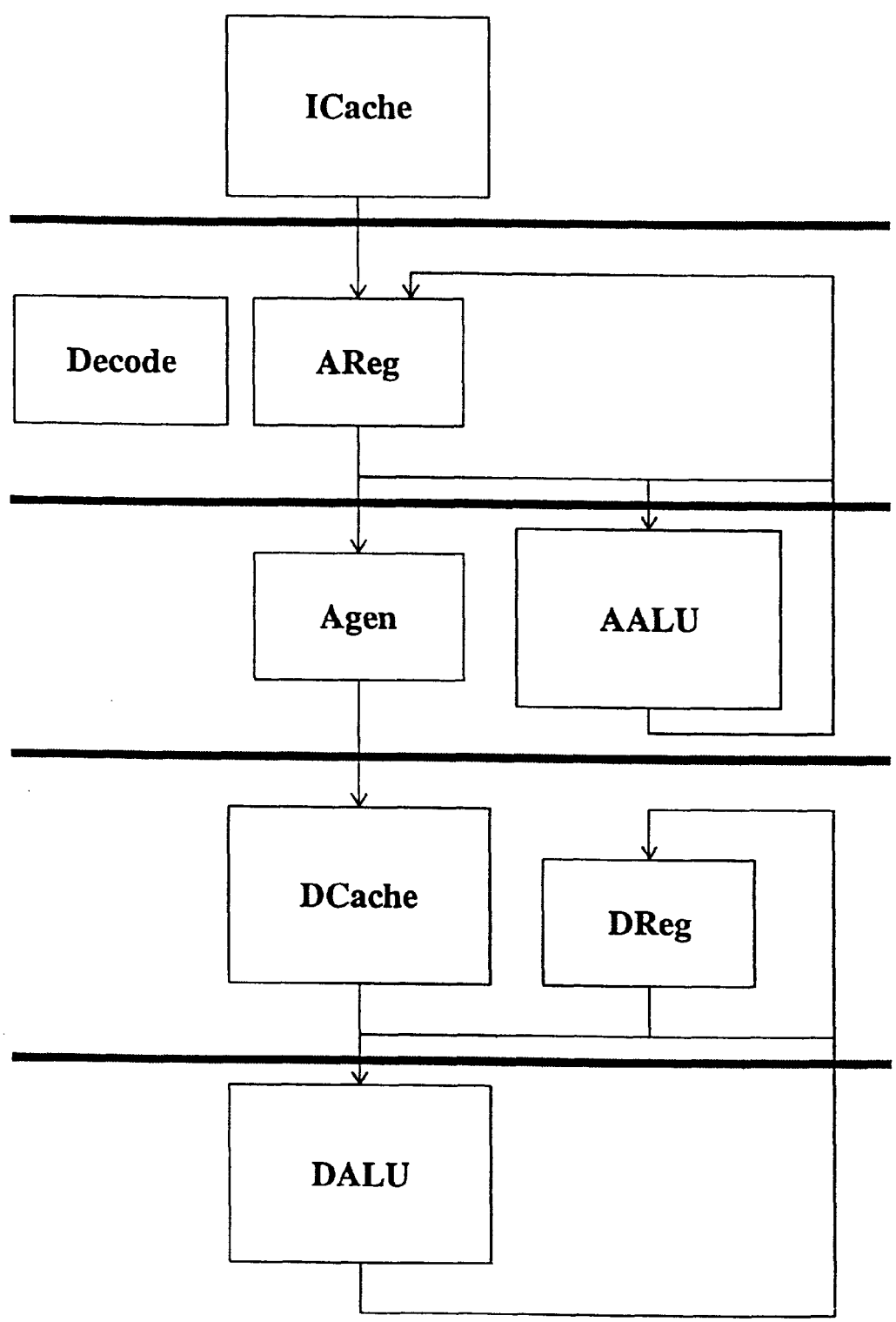

Various pipeline structures may be used within the processor; however, certain features of the instruction set work best with certain implementation classes, and one such type is generally shown in FIG. 2. Architectures of this type may advantageously be used with major computational units such as floating point units and DSPs, and one salient point of this pipeline architecture is that its placement of such units after the Dcache (in the positions labeled DReg/DALU in FIG. 2) allows instructions for such units to include a memory reference as one source operand. This allows a data cache reference and operation every cycle without requiring the fetch and execution of multiple instructions per cycle.

General Instruction Set Design Considerations

Many instruction set features improve performance (by lowering IE) and code size (by lowering IS) at the cost of increased processor implementation cost. For example, "auto-increment" address modes (in which the base address register is read and then re-written with an incremented address) requires a second register file write port for loads. "Indexed" addressing modes (in which the sum of two registers is used to form the virtual address) require three register file read ports for stores. The preferred embodiment is oriented toward a two read port, one write port register file, which is the minimum necessary for reasonable performance.

The preferred embodiment does have some features that increase the cost of implementation, but features that require as much increase as additional register file ports are avoided. This is especially important when implementations execute multiple instructions per cycle, since the number of ports is multiplied by the maximum execution capability of the processor (e.g., two to eight).

To maintain performance, the instruction set must support at least two source register fields and one distinct destination register field. Otherwise both IE and IS increase. General register instruction sets that optimize only for code density are sometimes designed around two register fields (e.g., Hitachi SH): one source only, and one used for both source and destination. This reduces code size when the increase in IS is offset by the decrease in BI, but there is no way to compensate for the increase in IE.

Instruction sets that specify fewer registers use narrower register fields, and thus lower BI, but increase IE and IS by forcing more variable and temporary values to live in memory and the therefore requiring additional load and store instructions. When only code density is a priority, the increase in IS may be offset by the decrease in BI for a net savings, but when good performance is also required, there is no way to compensate for the increase in IE.

As the number of the registers increases, the decrease in IE and IS levels off. An instruction set should provide at least enough registers to reach the point of diminishing returns, i.e., so that a further increase in register count does not result in a significant corresponding decrease in IE. In particular, at least 16 general registers are required for RISC performance levels. Also, three 4-bit register fields requires at least 12 bits to encode. Bits for opcode and constant fields are also required, and so a 16 bit encoding, as used by some processors, would not suffice.

Twenty-Four Bit Encoding

One reason that most prior art has failed to achieve an appropriate balance between code size and performance is that instruction set designers have felt constrained to certain instruction sizes such as 16 and 32 bits. There are indeed advantages to using instruction sizes that are simple ratios to the data word width of the processor. However, relaxing the restriction somewhat has significant advantages.

The preferred embodiment uses a 24-bit fixed-length encoding as a starting point, 24 bits being sufficient for high performance as well as providing extensibility and room for instructions that will decrease IE. Alternative embodiments could use encodings in the 18–28 bit range, but those less than 24 bits would have limited extensibility and limited branch range. The 24-bit encoding represents a 25% reduction in BI, and therefore code size, from most 32-bit RISC instruction sets. And finally, 24 bits is fairly simple to accommodate in a processor with 32 data path widths.

The preferred embodiment uses 4 bit register fields, the minimum required for acceptable performance and the maximum that fits well within a 24-bit instruction word. Many RISC instruction sets use 32 registers (5 bit register fields). After three 5-bit register fields, 24 bit instructions leave only 9 bits for opcode and constant fields. Short constant fields can result in inadequate range for branches, calls, and other PC-relative references. Too few bits for the opcode provides inadequate extensibility. For these two reasons a 24-bit instruction word with 5-bit register fields is not desirable. The difference in performance (due to differences in IE) between 16 and 32 general registers (about 6%) is not as large as the difference between 8 and 16 general registers, and is small enough that other features can be introduced to make up the lost performance (e.g., compound instructions and register windows—see below). The increase in IS (also about 6%) is more than offset by the difference between 24-bit and 32-bit encodings.

It should also be noted that many instruction sets with 5-bit register fields do not provide 32 general registers for compilation. Most dedicate a register to hold zero, but the need for a zero register can easily be eliminated by providing a few extra instruction opcodes. Also, other registers are often given specific uses that can be avoided by including other features in the instruction set. For example, MIPS uses two of its 31 general registers for exception handling code, and one for a global area pointer, so it in effect has only 28 registers for variables and temporaries, only 12 more than an instruction set with 4-bit register fields and appropriate instruction set features. The division of general registers into caller and callee saved registers by software convention is common, and further reduces the utility of larger register files; the preferred embodiment includes features that avoid this as described in greater detail below.

Compound Instructions

To lower IS and IE, the preferred embodiment also uses provides single instructions that combine that functions of multiple instructions typically found in RISC and other instruction sets. An example of a simple compound instruction is left shift and add/subtract. HP PA-RISC and DEC Alpha are examples of instruction sets that provide these operations. Address arithmetic and multiplication by small constants often use these combinations, and providing these operations reduces both IE and IS at a potential cost of increasing CP (because of additional series logic in the computation pipeline stage). However, various implementations have shown that when the shift is limited to 0 to 3, the extra logic is not the most critical constraint on CP. Conversely, the ARM instruction set provides arbitrary shift and add, and its implementations have had very poor CP.

Right shifts are often used to extract a field from a larger word. For an unsigned field extract, two instructions (either left shift followed by right shift, or right shift followed by an AND with a constant) are typically used. The preferred embodiment provides a single compound instruction, extui, to perform this function. It is implemented as a shift followed by an AND with a mask specified encoded in the instruction word in just 4 bits. The AND portion of extui is so logically trivial that its inclusion in the instruction set is not likely to increase the CP of implementations. This would not be true of an instruction to extract signed fields, and so this is not included.

Most instruction sets, both RISC and otherwise (e.g., ARM, DEC PDP11, DEC VAX, Intel x86, Motorola 68000, Sun SPARC, Motorola 88000) use a compare instruction that sets condition code(s), followed by a conditional branch instruction that tests the condition code(s) to determine the flow of control. Conditional branches constitute 10–20% of the instructions on most RISC instruction sets, and each is usually paired with compare instruction, so this style of instruction set is wasteful. Even older instruction sets were often based on a compare-and-skip style of conditionals, but this has the same disadvantages as separate compare and branch.

Some instruction sets (e.g., Cray-1, MIPS, DEC Alpha, HP PA-RISC, and the later V9 version of Sun SPARC) provide a compound compare and branch facility of varying flexibility. Cray and DEC Alpha provide only comparison of a register and zero and branch. MIPS provides register-zero comparisons and register-register equality and inequality and branch. HP PA-RISC provides a fairly complete set of register-register compare and branch instructions.

The preferred embodiment provides the most useful compound compare and branch instructions. Choosing the exact set requires balancing the utility of each compare and branch with the opcode space that it consumes, especially when a 24-bit (as opposed to 32-bit) encoding is the target Other instruction sets fail this test. For example, HP PA-RISC provides several compound compare and branch opcodes that are almost no utility (e.g., never and overflow after add), and omits several that are useful. The set of compound compare and branch instructions chosen for the preferred embodiment is

A==0, A !=0, A<S0, A>=S0,

A==B, A!=B, A<SB, A<UB, A>=SB, A>=UB, (A & B)==0, (A & B) !=0, (~A & B)==0, (~A & B) !=0,

A==I, A !=I, A<SI, A<UI, A>=SI, A>=UI, bit B of A==0, bit B of A !=0, bit I of A==0, bit I of A !=0 where A and B denote the contents of registers, the "U" or "S" suffix on a relational operator with a register denotes "unsigned" or "signed" comparison to register contents which are unsigned or signed, respectively; the suffixes on a relational operator with zero (e.g., A<S0) denote unsigned or signed comparison to zero; and I denotes an index constant.

Compound compare and branch reduces IE and IS compared with separate compare and branch instruction sets, and even when compared with the partial compare and branch instruction sets like MIPS and DEC Alpha. The preferred embodiment may require an increase in CPI to implement compound compare and branch, but the overall performance effect is still an improvement.

The primary advantage of separate compare and branch instruction sets is that two instruction words are available for specifying the comparison operator, the comparison operands, and the branch target, which allows generous field width allocations to each. In contrast compound compare and branch instruction sets must pack all of these into a single instruction word, resulting in smaller fields, and the need for a mechanism to handle values that won't fit (e.g., branches with longer range). The preferred embodiment packs the comparison opcode, two source register fields, and an 8-bit PC-relative offset into a 24-bit instruction word. The 8-bit target specifier will be insufficient in some cases, and the compiler or assembler will need to use a conditional branch of the opposite nature around an unconditional branch with a longer range, which the preferred embodiment provides. This situation of course increases IE and IS, which is undesirable. For this reason the preferred embodiment also provides a series of compound compare and branches that test against zero, which is the most common case. These compound compare and branch instructions have a 12-bit PC-relative offset, which provides much greater range than their colleagues. The extra complexity of providing both forms is balanced by the improvements in IE and IS. The preferred embodiment does not provide all of the comparisons against zero (omitting register less than or equal to zero and register greater than zero), unlike MIPS and DEC Alpha; again the preferred embodiment provides the set of instructions that balances program needs with opcode space.

One consequence of using only 24 bits to encode all instructions is that constant fields in the instruction word are limited in size. This could potentially increase IS and IE (although the increased IE can be reduced by loading the constants into registers outside of loops). The preferred embodiment addresses this problem in several ways. First, it provides small constant fields to capture the most common constants. To get the maximum use of narrow (e.g., 4-bit) constant fields, the instruction set uses the field to encode a constant value rather than specify it directly. The encoded values are chosen from a wide array of program statistics as the N (e.g., 16) most frequent constants. The preferred embodiment uses this technique in the addi.n instruction, where the 16 values are chosen to be −1 and 1 to 15, rather than 0 to 15. Adding 0 is of no utility (there is a separate mov.n instruction), and adding −1 is common. The beqi, bnei, blti, bgei instructions also use a 4-bit field that encodes various common constants. The bltui and bgeui instructions use a different encoding, as unsigned comparisons have a different set of useful values.

The most common constants are typically quite small, and narrow fields do capture most of the desired values. However, the constants used in bitwise logical operations (e.g., AND, OR, XOR, etc.) represent bit masks of various sorts, and often do not fit in small constant fields. For example, constants with a single bit set to one in any position, or a single bit set to zero in any position are common. Also common are bit patterns consisting of a sequence of 0's followed by a sequence of 1's, and a sequence of 1's followed by a sequence of 0's. For this reason, the preferred embodiment has instructions that avoid the need for putting a mask directly into the instruction word. Examples in the preferred embodiment are the bbci and bbsi instructions, which branch on whether the specified bit of a register is zero or one respectively. The bit is given as a bit number, rather than a mask. The extui instruction (described earlier) does a shift followed by a mask consisting of a series of 0's followed by a series of 1's, where the number of 1's is a constant field in the instruction.

Coprocessor Boolean Registers and Branches

Because compound compare and branches pack so much into an instruction word no wider than thirty-two bits, the instructions listed above consume a significant portion of the available instruction words. This is a good tradeoff for these branches because of their frequency and the savings that results.

In addition to the other constraints on instruction set design is the requirement that the instruction set should be extensible (allowing the addition of new data types), a feature exploited in closely coupled coprocessors. However, a short instruction word may lack space to also add compound compare and branch instructions for other data types, such as floating-point, DSP, etc. Further, it may be infeasible for each coprocessor to implement its own compound compare and branch. Even when implementation of individual compound compare and branch instructions is feasible, it may be wasteful because comparisons and branches on such data types are also less frequent than on integer data for many applications.

For this reason, the preferred embodiment of this invention uses a different method for coprocessor conditional branches. In the preferred embodiment, the instruction set includes an optional package that is a prerequisite to any coprocessor package. This package adds sixteen single-bit Boolean registers and the BF (branch if false) and BT (branch if true) instructions that test these Boolean registers and branch accordingly. The coprocessors then provide instructions that set the Boolean registers based on, for example, comparisons of their supported data types. The Boolean registers and the BF and BT instructions are shared by all coprocessors, which makes efficient use of a short instruction word.

This is a new variant of the condition code-based compare and branch found in many earlier instruction sets, as discussed above. Earlier instruction sets have multiple shared multi-bit condition codes between the processor and its coprocessors (e.g., the PowerPC) and used multiple per-coprocessor single-bit condition codes (e.g., MIPS). The preferred embodiment of the present invention uses multiple shared single-bit condition codes.

Providing multiple destinations for comparisons (e.g., in the preferred embodiment of the present invention, MIPS, PowerPC) allows the compiler to schedule code more freely and allows for instructions that compare multiple data values in a single instruction producing multiple results (e.g., MIPS MDMX).

Sharing the comparison result registers between multiple coprocessors (the present embodiment) or the processor and its coprocessor (as in the PowerPC) saves on the number of opcodes required for testing comparison results. This also increases the feasibility of providing instructions that perform logical operations on the comparison result registers (as in the preferred embodiment of the present invention and the PowerPC).

The use of single-bit comparison result registers (the preferred embodiment of the present invention, MIPS) instead of multi-bit (most other ISAs) increases the number of comparison opcodes required but decreases the number of branch opcodes required. The preferred embodiment uses single-bit comparison result (Boolean) registers because branch instructions must also provide a PC-relative target address, and thus adding branch opcodes is more expensive unless there is a large number of coprocessors.

In summary, while compound compare and branch is an important technique for minimizing code size, the need to keep BI small finds that a split approach is appropriate for coprocessor comparison and branch because of different frequency and the number of different coprocessor opcodes required. Within the spectrum of split compare and branch choices, the use of multiple single-bit comparison result registers that are shared between coprocessors makes the most efficient use of opcode space.

Load and Store Instructions

The preferred embodiment's load and store instructions use an instruction format with an 8-bit constant offset that is added to a base address from a register. First the preferred embodiment makes the most of these 8 bits, and second it provides a simple extension method when this is insufficient. Also, the preferred embodiment's four load/store offsets are zero extended rather than sign extended (common in many other instruction sets) because the values 128 to 255 are more common than the values –128 to –1. Also, the offset is shifted left appropriately for the reference size because most references are to aligned addresses from an aligned base register. The offset for 32-bit loads and stores is shifted by 2; the offset for 16-bit loads and stores is shifted by 1; and the offset for 8-bit loads and stores is not shifted. Most loads and stores are 32-bit, and so this technique provides 2 additional bits of range.

When the 8-bit constant offset specified in a load/store instruction (or an addi instruction) is insufficient, the preferred embodiment provides the addmi instruction, which adds its 8-bit constant shifted left by 8. Thus a two instruction sequence has 16 bits of range, 8 from the addmi, and 8 from the load/store/addi. Further, constants that are not encoded by one of the methods above must be loaded into a register by separate instructions (this technique is not applicable to load/store instructions, which only take a single register operand, instead of two, and so the addmi solution above is required). The preferred embodiment provides two methods to load constants into a register. The first is movi (and movi.n in the short instruction format described below) instructions for this purpose. movi specifies its constant in a 12-bit sign-extended pair of fields in the instruction word. Also, assigning a constant value to a register variable is common by itself.

In instruction formats of 32 bits or less, no instruction can encode an arbitrary 32-bit constant, and so some other method is required to set a register to an arbitrary constant value. At least two methods have been used in other instruction sets, and either of these methods may be used in conjunction with the above techniques provide a solution. The first solution is to provide a pair of instructions that together synthesize a 32-bit constant using multiple constants in each of the instructions (e.g., MIPS LUI/ADDI, DEC Alpha, IBM PowerPC, have instructions that specify the high 16 bits and low 16 bits in two separate instructions). The second solution (e.g., MIPS floating point constants, MIPS 16, and ARM Thumb) is to provide a simple way to read the constant from memory with a load instruction.

Using a load instruction to reference constants can provide lower IS and IE than using a sequence of instructions if the load itself requires only a single instruction. MIPS compilers, for example, dedicate one of the 31 general registers to hold a pointer to (among other things) a constant pool where 4-byte and 8-byte floating point constants are kept. If the area addressed by this register is less than 64 KB, the constants can be referenced by a single load instruction, because MIPS has 64 KB of offset range in loads. For a constant that is referenced once, the 32-bit load instruction plus the 32-bit constant is the same total size as two using instruction words. If the constant is referenced twice or more, the constant pool provides smaller total size. The tradeoff is different for other instruction lengths, such as the 24-bit size of the preferred embodiment, where the constant pool plus load is 56 bits vs. 48 bits for a pair of 24-bit instructions). Nonetheless, when a constant is used multiple times, the constant pool is almost always a better total size solution.

The MIPS technique of dedicating a register to address constants and other values is not desirable for the preferred embodiment and other embodiments of this invention because as mentioned above, narrower instruction words generally provide less than 32 registers, and so each register is more valuable. Also, the offsets available from a register in narrower instruction sets are limited, and so a single register provides access to only a small constant pool (too small to be practical). The preferred embodiment adopts the solution of many instruction sets (e.g., PDP11, Motorola 68000, MIPS16, ARM Thumb) in providing a PC-relative load that can be used to access a constant pool.

Either technique for loading arbitrary constants is applicable to this invention. The preferred embodiment uses the second technique, whereas an alternate embodiment would use a plurality of instructions, each containing a part of the complete constant. A concrete example of an alternate embodiment for a 24-bit instruction words would have one instruction put a 16-bit instruction constant into the high part of a register (16-bit constant+4-bit register destination+4-bit opcode=24 bits), and a second to add a 16-bit signed constant to a register (16-bit constant+4-bit register source and destination+4-bit opcode=24 bits).

Reduced-Overhead Loop Instructions

The preferred embodiment also provides a loop feature found in some digital signal processors (DSPs) but which is not found in RISC processors. Most RISC processors use their existing conditional branch instructions to create loops rather than implement the loops by providing new features. This economy keeps the processor simpler, but increases IE and CPI. For example, the C loop

```
for (i = 0; i < n; i += 1) {
    body
}
``` would be compiled as

```
       movi.n a3, 0          // initialize i
       blti a2, 1, done      // no iterations if n <= 0
loop:
       body
       addi.n a3, a3, 1      // i += 1
       blt a3, a2, loop      // continue if i < n
``` in the preferred embodiment. There are two instructions of "loop overhead" in every iteration, an add and a conditional branch. (Three instructions of overhead would be required without the preferred embodiment's compare and branch feature.) This clearly adds to IE. In addition, a taken conditional branch in some processor implementations may require more cycles to execute than other instructions due to pipelining and/or branch prediction. Thus CPI may increase. Some instruction sets add a single instruction to increment or decrement a register, compare, and branch (e.g., DEC PDP6, DEC PDP11, IBM PowerPC) to lower IE in this case. (The implementation of the IBM PowerPC instruction is also targeted at lowering CPI.)

The performance impact of the loop overhead is higher when the loop body is small. Many compilers use an optimization called loop unrolling in this case to spread the loop overhead over 2 or mote iterations. In C, the above loop could be, for example, transformed to

```
            i = 0;
            if (n > 0) {
                if ((i & 1) != 0) {
                    body
                    i += 1;
                    if (n == 1) goto done;
                }
                do {
                    body
                    i += 1;
                    body
                    i += 1;
                } while (i < n);
            done: ;
            }
```

In some cases

```
            body
            i += 1;
            body
            i += 1;
``` may be replaced with

```
            body(i)
            body(i+1)
            i += 2;
``` when i+constant can be folded into the instructions of body (e.g., into the offset of load and store instructions) so that only one increment is required per iteration.

Loop unrolling by a factor greater than 2 is quite common, with 4 and 8 being common (powers of two having some advantages). The thing to note about even a factor of two unroll is the increase in code size that results (the body occurs three times in the example above). The use of this technique in RISC processors to achieve performance is consistent with their emphasis on performance and simplicity over code size.

Many DSPs, and some general-purpose processors have provided other ways to perform certain kinds of loops. The first method is to provide an instruction that repeats a second instruction a fixed number of times (e.g., TI TMS320C2x, Intel x86). This has the advantage of being fairly simple to implement. Where it is applicable, it eliminates loop overhead, and saves power consumption by eliminating the need to repeatedly fetch the same instruction. Some instruction sets with repeat instructions require that the processor not take an interrupt during the loop, which is a significant restriction. Also, single instruction loops are useful only in limited circumstances, and only when the repeated instruction is complex enough to have multiple effects, so that it operates on different data on each iteration.

An improvement on simple repeat instructions is the ability to iterate a block of instructions multiple times with reduced or zero loop overhead (e.g., TI TMS320C5x). The preferred embodiment provides this capability via its loop, loopgtz and loopnez instructions. The first C loop above would be compiled into the following instructions:

```
    movi.n   a3,  0          // i = 0
    loopgtz  a2,  done       // goto done if a2 <= 0, otherwise
                             // set LCOUNT to a2 - 1, LBEG to loop,
                             // and LEND to DONE, and then fall
                             // into body
loop:
    body
    addi.n   a3,  a3, 1      // i += 1
                             // the processor returns automatically
                             // to loop when it reaches here (LEND)
done:
```

The LCOUNT, LBEG, and LEND registers are made explicit in the instruction set so that loops are interruptible. It also allows these registers to be read and written in parallel with other instruction execution (if general registers were used, the register file read/write ports would need to be increased). The preferred embodiment specifies that the LCOUNT register is decremented immediately after it is tested to give maximum time to affect instruction fetch. The loop instructions are expected to allow the preferred embodiment to avoid the taken branch penalty that would be associated with a conditional branch compilation of loops.

The increment of a3(i) is not performed automatically by the loop instructions. This is left as a separate instruction, as shown above, since many loops require increments or decrements of the induction variables by different amounts, especially after strength reduction optimization. In addition, in some cases these increments can be folded into coprocessor address modes such as auto-increment. Finally, to increment a general register would require extra port(s) on the general register file.

As can be seen from the examples and discussion above, loop instructions reduce both IE and IS and facilitate implementations that reduce CPI. The impact on IS is largest when the loop instructions avoid the need to do loop unrolling, but is present even in the unrolled case. There is, however, additional processor implementation cost that will be required by the presence of these instructions in the preferred embodiment (e.g., special registers, special instruction fetch logic) as will be readily apparent to those skilled in the art.

Hazards

Most instruction sets are now implemented by pipelined hardware. The use of pipelines often creates hazards during instruction executions that must be avoided in either hardware or software. For example, many pipelines write the register file at the end of (or at least late in) the pipeline. For correct operation, subsequent instructions that use the register being written as a source operand must either wait to read the register file until the value is written, or the value to be written must be bypassed or forwarded to the dependent instructions, and the register file contents ignored.

Most processors provide dependency detection in hardware for their general register file and both delay dependent instructions until the result is available and then bypass it into the dependent operation before it is written to the register file. Delaying instructions in software (usually by inserting NOPs) would significantly increase code size (by increasing IS), and not bypassing would significantly decrease performance. Thus the detection, stall, and bypass hardware is worth its cost.

However, for processor states other than the general-purpose register file, the tradeoff may be different because such registers are often referenced infrequently. Some instruction sets (e.g., MIPS) therefore switch to software handling of special-register hazards (e.g., by inserting NOPs to separate the write from the use). This unfortunately requires that knowledge of the pipeline be built into the instruction stream.

An alternative would be to have the special register write delay all subsequent instructions to avoid hazards. While this is simple and solves the problem, it can be inefficient because the special register writes often occur in groups (e.g., to the restore state after a context switch or interrupt), and there is often no reason to delay other special register writes and the instructions that they depend on.

The preferred embodiment of the present invention adopts a hybrid approach. It provides the ISYNC, RSYNC, ESYNC, and DSYNC instructions that software must insert to avoid hazards not detected and avoided by hardware. Unlike the use of NOPs, these instructions stall until all special register writes are complete. This allows a single implementation-independent instruction to accomplish what would otherwise require a potentially large number of implementation-specific NOPs. It also allows the programmer to group special register writes together without stalls to maximize performance.

Code Density Option

The preferred embodiment's instruction set consists of a core set of instructions that are preferably present in all implementations of the instruction set, and a set of optional instruction packages that may or may not be present in a given implementation. One such package is a short instruction format that provides significant code size reductions by reducing BI, the average bits per instruction. When these short-format instructions are present, the preferred embodiment changes from a fixed-length (24-bit) instruction set, to one with two instruction sizes (24-bit and 16-bit). Alternate embodiments might pick a different set of instruction sizes. For example, one alternative with similar code density to 24/16 encoding is 24/12, where there are two register fields in the short form instead of three.

Because the short instruction forms are optional, these forms are used solely for improving code size; no new functionality is present in these instructions. The set of instructions that can be encoded in 16 bits is chosen as the most statistically frequent instructions that will fit (or can be altered to fit, e.g., by reducing constant field width). The most frequent instructions in most instruction sets are loads, stores, branches, adds, and moves; these are exactly the instructions present in the preferred embodiment's 16-bit encodings. The use of a short format entirely to reduce BI is in contrast to other variable length instruction sets such as the Motorola 68000, Intel x86 and DEC VAX, where each instruction has an encoding that depends primarily on the number of operands and operand kind, and not on static frequency of use.

The only instruction set known to have a similar property to the present invention is the Siemens Tricore, which has a 32-bit primary format and a 16-bit short format for reducing BI. Unlike the present invention, the primary format is too long to achieve exemplary BI, and the short form is not as functional, as it provides only two register fields which forces one of the source and destination registers to be identical, or one of the source or destination registers to be implied by the opcode. As discussed earlier, the use of implied source registers is likely to increase either the CP or CPI of implementations.

Earlier it was shown that a 16-bit only instruction set provides insufficient performance and functionality. A 16-bit encoding of the most frequent instructions avoids this pitfall. Because only the most frequent instructions need short encodings, three register fields are available, and narrow constant fields can capture a significant fraction of the uses. Approximately half of the instructions needed to represent an application can be encoded in just six of the sixteen opcodes available in a 16-bit encoding after three 4-bit fields are reserved for register specifiers or constants.

The 16 bit encoded dense instruction option includes an l32i.n instruction (load 32 bits, 4 bit offset); s32i.n (store 32 bits, 4 bit offset); mov.n (move the contents of one register to another); add.n (add the contents of two registers); addi.n (add register and immediate, where immediate is −1 or in the range of 1 . . . 15); movi.n (load register with immediate, where immediate is in the range of −32 . . . 95); nop.n (no operation); break.n (break); ret.n, retw.n (ret and retw); beqz.n (forward branch with 6 bit unsigned offset if register is zero); and bnez.n (forward branch with 6 bit unsigned offset if register is non-zero).

An alternate embodiment would use a 12-bit short form as noted above. A 12-bit form only supports two 4-bit fields in addition to the 4-bit major opcode. This supports only loads and stores with no offset (sometimes called register indirect addressing in the field), and an add instruction where the destination and one source register are the same. These restrictions are not a limitation on performance, as they would be in other circumstances, because the compiler is free to use the longer three operand forms when appropriate. The restrictions do prevent the 12-bit form from being used as often, but its reduced size partially compensates. At 30% 12-bit and 70% 24-bit, BI would be 20.4 bits, nearly the same as the 20.0 bits achieved by 50% 16-bit and 50% 24-bit. There are some implementation simplifications that come when one format is half the size of the other, but there are some implementation issues when the greatest common divisor (gcd) of the instruction sizes and data width is small (this is 4 for 24, 12, and 32, and 8 for 24, 16, and 32). Overall the two are about equal in implementation cost, and so the preferred embodiment is the one that gives better code size, which is 24/16.

There is one additional code size disadvantage of 24/16 compared to 24/12. Branch offsets (instruction constants specifying the target instruction via a difference of instruction addresses) must be multiples of the gcd of all of the instruction sizes. This is 12 for 24/12 and 8 or 24/16. The larger this number, the further (in bits) the branch can reach. Branches that exceed this reach require a multiple-instruction sequence, which increases IS.

The most significant advantage of fixed length instructions, as found in most RISCs, comes when the processor implementation executes multiple instructions per cycle. In this situation, the instructions are usually decoded in parallel. With variable length instructions, enough decoding must be done on the first instruction to find the start of the second, so that decoding can begin on it; enough decoding must be done on the second instruction to find the start of the third, and so on. This may increase CP. Adding a pipeline stage to avoid increasing CP will most likely increase CPI. Some implementations get an early start by decoding every potential instruction start, and then selecting the actual instructions when that information becomes available from the decode of previous instructions. This clearly increases the cost of the implementation. Adding a pipeline stage to sort out the instructions likewise increases cost. Still other possibilities, such as predecoding into the instruction cache as also possible, but all increase implementation cost.

While the preferred embodiment does not eliminate the variable length decoding problem, it makes it as simple as possible, by first using only two instruction lengths, and second by using a single instruction bit to distinguish between the two lengths. This minimizes the implementation cost and any effect on CP. And fmally, by making the short forms optional, the preferred embodiment makes it possible to eliminate the cost and CP effect when code size is not the number one priority.

Many instruction sets work with either little-endian or big-endian byte ordering. Techniques to accomplish this are described in, e.g., U.S. Pat. No. 4,959,779 to Weber et al. However, instruction sets with variable sized instructions require additional care. The MIPS instruction set uses the same instruction format for big and little endian byte orders, which only works because the instructions are all one size. The preferred embodiment specifies different instruction words for big and little endian byte orders to maintain the property that the bits that are necessary to determine the instruction size are present in the lowermost numbered addressed byte (the smallest addressable unit in the preferred embodiment).

Windowed Register Option

Another optional package is the windowed register option. It is provided to lower IE and IS. The increase in performance from lowered IE also compensates for the increase in IE due to having 16 registers instead of 32. Register windows are found on a few other processors, such as Sun SPARC. For a complete introduction to the subject, see the Sun SPARC documentation. The name "register window" describes the typical implementation where the register field in the instruction specifies a register in the current window onto a larger register file. The position of the window is described by a window base register.

Register windows avoid the need to save and restore registers at procedure entry and exit (which decreases IS and IE). This is accomplished by changing the pointer at these points, which essentially hides some registers from view and exposes new ones. The exposed registers usually do not contain valid data, and can be used directly. However, when the exposed registers do contain valid data (because the window has moved so far that it has wrapped around to a previous call frame's registers), the hardware detects this and stores the valid registers to memory before execution continues (this is usually accomplished by a trap to a software handler). This is called register window overflow. When a call returns to a frame whose registers have been stored to memory, register window underflow has occurred and the processor most load the values from memory (this is also usually accomplished by a trap to a software handler).

Register windows that overlap in their views of the physical register file between the caller and callee also avoid argument shuffling that can occur when arguments to procedures are passed in registers (argument shuffling increases IS and IE). Finally register windows change the breakeven point for allocating a variable or temporary value to a register, and thus encourage register use, which is faster and smaller than using a memory location (also decreases IS and IE).

The primary differences between this invention's register windows and SPARC's are (1) SPARC has a fixed increment of 16 for the window pointer; (2) SPARC has global registers in addition to windowed registers and the preferred embodiment does not; and (3) SPARC detects window overflow as the condition where the current window overlaps with a previous window whereas the preferred embodiment detects window overflow as the reference to a register that is part of previous window.

The change from a fixed increment to a variable increment is important to keeping implementation cost low. It allows a much smaller physical register file to be used. For example, many Sun SPARC implementations use a physical register file of 136 entries, whereas the preferred embodiment might require a register file of only 64 entries to achieve similar window performance. There is an increase in complexity for variable increments, but the difference in processor implementation cost can be 30% or more (this is the cost of the larger register required by the simpler fixed-increment SPARC method). The preferred embodiment specifies new methods to detect overflow and underflow, and to organize the stack frame.

On the surface, the register window mechanism would seem to increase CP (or CPI) by requiring an add (albeit a short one) in series with the register file read. (Register writes are not an issue, as there is one cycle in the pipeline to do the add.) However, it is possible to implement register window access in a way that has similar timing to a non-windowed register access to a register file the size of the window. For example, consider a physical register file of 64 registers, and a window of 16 that is visible to any given instruction. In this case, sixteen 64:1 muxes could be used to select the sixteen visible registers based only on the window pointer, and then these 16 results accessed like a 16-entry register file. Using sixteen 64:1 muxes does have a high implementation cost. For this reason the preferred embodiment specifies that the window pointer be restricted to multiples of four, reducing this cost by a factor of four. Even in implementations that choose to use series addition, this guarantees that two bits of the register number can be used to start the register file access immediately, with the slower sum bits (the sum of 4-bit and 2-bit inputs) being used at a later point in the access. Finally, hybrids between these two implementations are possible, with intermediate implementation cost.

Modifications and variations of the preferred embodiment will be readily apparent to those skilled in the art. Such variations are within the scope of the present invention as defined by the appended claims.

What is claimed is:

1. A processor comprising:
   at least sixteen general-purpose registers;
   means for accessing a memory to exchange data with the registers; and
   an operational unit for processing instructions from the memory, substantially all of the instructions having a length of not more than twenty-eight bits;
   wherein at least one of the instructions has an opcode field, a field specifying a constant operand to the instruction, a source register field capable of designating any one of the general-purpose registers as a source register, and a destination field capable of designating any one of the general-purpose registers as a destination register;
   at least one of the instructions has an opcode field, a plurality of source register fields each capable of designating any one of the general-purpose registers as source registers, and a destination field capable of designating any one of the general purpose registers as a destination register;
   at least one of the instructions causes the operational unit to execute a plurality of compound operations, a first one of the operations being one of a first arithmetic and a logical operation and a second one of the operations being one of a second arithmetic operation and a conditional branch operation.

2. The processor of claim 1 wherein:
the instructions include a first group of instructions having a same first fixed instruction length and a second group of instructions having a same second fixed instruction length different from the first fixed instruction length; and
a given bit field in an opcode field common to both groups indicates a group to which an instruction having that bit field belongs.

3. The processor of claim 1 wherein the first one of the operations is a comparison of register values indicated by source register fields within the instruction and the second one of the operations is a branch operation responsive to a result of the comparison.

4. The processor of claim 1 wherein the first one of the operations is a logical left shift of contents of a register indicated by a source register field and the second one of the operations is an arithmetic operation on the shifted register contents and another source register value.

5. The processor of claim 1 wherein the first one of the operations is a logical right shift of contents of a register indicated by a source register field and the second one of the operations is a logical AND operation on a result of the shift with a value specified by a constant field of the instruction.

6. The processor of claim 1 wherein:
at least one instruction causes the processor to execute instructions starting at a first instruction address until a second instruction address is reached, to then continue execution again at the first address, and to repeat a number of times determine by contents of a source register indicated by a source register field of the instruction.

7. The processor of claim 1 wherein the processor includes at least one instruction having a constant field designating a constant value in a lookup table.

8. The processor of claim 1, further comprising:
a plurality of special-purpose registers; and
means for accessing the special purpose registers to exchange data therein with a coprocessor;
wherein at least one of the instructions is a conditional branch responsive to data in a special-purpose register being a predetermined value.

9. The processor of claim 8, wherein:
the special-purpose registers are single-bit registers; and
the means for accessing is further for exchanging data between the single-bit registers and a plurality of coprocessors.

10. The processor of claim 1, further comprising:
a special-purpose register; and
state indicating means for selectively indicating that execution of a write to the special-purpose register is not yet complete, and that execution of all pending special-purpose register writes has been completed;
wherein the instruction set includes an instruction causing the operational unit to delay execution of subsequent instructions until the state indicating means indicates that execution of all pending writes has been completed.

11. A processor comprising:
multiple registers to store data therein;
means for accessing a memory to exchange data between the memory and registers; and
operating means for executing instructions from the memory to process data stored in the registers;
wherein a plurality of the instructions have multiple register fields, each register field being at least four bits wide;
the instructions include at least one each of a load, a save, a conditional branch on equality, a conditional branch on inequality, and an arithmetic operation each encoded in not more than twenty-eight bits;
the operating means is for, responsive to executing a load instruction, loading data into a register designated by contents of a destination register field of the load instruction from a memory location corresponding to a sum of contents of a register specified by a source register field of the instruction and a constant field of the load instruction;
the operating means is for, responsive to executing a store instruction, storing data from a register designated by contents of a first source register field of the store instruction in a memory location corresponding to a sum of contents of a register specified by a second source register field of the store instruction and a constant field of the store instruction;
the operating means is for, responsive to executing a conditional branch on equality instruction, sequentially executing instructions from the memory beginning at a location corresponding to a relative offset value indicated by the conditional branch on equality instruction when contents of two registers indicated by the conditional branch on inequality instruction are equal;
the operating means is for, responsive to executing a conditional branch on inequality instruction, sequentially executing instructions from the memory beginning at a location corresponding to a relative offset value indicated by the conditional branch on inequality instruction when contents of two registers indicated by the conditional branch on inequality instruction are not equal; and
the operating means is for, responsive to executing an arithmetic instruction, performing an arithmetic operation on contents of a plurality of registers indicated by respective source register fields of the arithmetic instruction and storing a result thereof in a register indicated by a destination register field of the arithmetic instruction.

12. The processor of claim 11 wherein:
a source register field of each of the load, store, conditional branch on equality, conditional branch on inequality and arithmetic instructions is in a same position relative to a boundary of each instruction; and
an additional source register field of the store, conditional branch on equality, conditional branch on inequality and arithmetic instructions is in a same position relative to a boundary of each instruction.

13. The processor of claim 12 wherein the operating means is further for, responsive to executing a loop instruction once, executing other instructions multiple times.

14. The processor of claim 13 wherein:
the load, store, conditional branch on equality, conditional branch on inequality and arithmetic instructions are each encoded in a same first fixed length; and
the operating means, responsive to execution of each of a short load, a short store, a short conditional branch on equality, a short conditional branch on inequality and a short arithmetic instruction each encoded in a same second fixed length shorter than the first fixed length, performing a corresponding operation of the respective load, store, conditional branch on equality, conditional branch on inequality and arithmetic instructions.

15. The processor of claim 13 wherein:

the operating means includes a window base register indicating a group of registers within a register file; and the operating means is further for windowing the group of registers in the register file so that the register fields indicate registers relative to a window in a group of registers.

16. The processor of claim 15 wherein a window base register relative increment is specified by a constant in a subroutine call instruction.

17. A processor comprising:

multiple registers to store data therein;

means for accessing a memory to exchange data between the memory and the registers; and operating means for executing instructions from the memory to process data stored in the registers;

wherein each of the instructions is less than thirty-two bits wide and a plurality of the instructions have multiple source register fields and a destination register field, each of the register fields being at least four bits wide;

the operating means is for, responsive to executing a load instruction, loading data into a register specified by a destination register field of the load instructions from a memory location corresponding to a sum of contents of one of a register specified by a source register field of the instruction and a constant field of the instruction;

the operating means is for, responsive to executing a store instruction, storing data from a register specified by a first source register field of the instruction in a memory location corresponding to a sum of contents of a register specified by a second source register field of the instruction and a constant field of the instruction; and the operating means is for, responsive to executing a conditional branch instruction, performing a test and, if a result of the test is true, sequentially executing instructions from the memory beginning at a location corresponding to a relative offset value indicated by the conditional branch instruction, the test being selected from a first group consisting of equality of contents of two source registers, inequality of contents of two source registers, bitwise logical AND of two source registers being equal to zero, bitwise logical AND of two source registers being not equal to zero, a binary bit of data in a first source register designated by contents of a second source register being zero, a binary bit of data in a first source register designated by contents of a second source register being one, a binary bit of data in a source register designated by a field of the instruction being zero, a binary bit of data in a source register designated by a field of the instruction being one, contents of a first source register designated by a field of the instruction being two's complement less than contents of a second source register, contents of a first source register designated by a field of the instruction being two's complement greater than or equal to contents of a second source register, contents of a first source register designated by a field of the instruction being unsigned less than contents of a second source register, contents of a first source register designated by a field of the instruction being unsigned greater than or equal to contents of a second source register, equality of contents of a source register and a constant field of the instruction, inequality of contents of a source register and a constant field of the instruction, contents of a source register being two's complement less than a constant field of the instruction, contents of a source register being two's complement greater than or equal to a constant field of the instruction, contents of a source register being unsigned less than a constant field of the instruction, and contents of a source register being unsigned greater than or equal to a constant field of the instruction.

18. The processor of claim 17 wherein the test is selected from one of the first group and a second group consisting of:

contents of a source register being zero;

contents of a source register being non-zero;

contents of a source register being two's complement less than zero; and contents of a source register being two's complement greater than zero;

wherein each comparison against zero specifies an offset for designating a branch target larger than an offset of a corresponding instruction comparing a source register to a non-zero argument.

19. The processor of claim 18 wherein testing involving a comparison of a source register with a constant field of the instruction form the constant by reference to a location in a lookup table specified by the field value.

20. The processor of claim 19 wherein all instructions are less than thirty-two bits long.

21. The processor of claim 20, the instructions including conditional branch instructions encoded in fewer bits and using a shorter relative offset field than corresponding conditional branch instructions and including a test being one of contents of a source register is zero and contents of a source register is non-zero.

* * * * *